United States Patent [19]

Sprague

[11] 3,813,480
[45] May 28, 1974

[54] DEVICE OF INSULATING MATERIAL HOLDING ADJACENT LENGTHS OF SEMI-RIGID ELECTRICAL CONDUCTORS JOINED

[76] Inventor: Stephen B. Sprague, 23920 Anza Ave. No. 244, Sunnyvale, Calif. 90505

[22] Filed: May 21, 1973

[21] Appl. No.: 362,369

[52] U.S. Cl............. 174/92, 174/138 F, 191/23 A, 191/30, 191/44.1
[51] Int. Cl............................................ H01r 7/02
[58] Field of Search....... 174/5 R, 84 R, 84 S, 88 B, 174/92, 138 D, 138 F, 155, 156; 191/22 R, 23 A, 30, 31, 35, 44.1; 238/14.3, 14.4, 14.8, 152, 159, 160, 161

[56] References Cited
UNITED STATES PATENTS

| 908,180 | 12/1908 | Wilgus et al............................ 191/30 |
| 2,670,136 | 2/1954 | Moses................................. 191/30 X |
| 2,994,734 | 8/1961 | Scofield et al................... 174/84 R |
| 3,189,679 | 6/1965 | Scofield........................... 174/84 R |
| 3,609,254 | 9/1971 | Caldwell.......................... 174/92 X |

Primary Examiner—Laramie E. Askin
Attorney, Agent, or Firm—Allen & Chromy

[57] ABSTRACT

This device is provided with two parts of insulation material that are similar and are held together by pins extending through holes in the electrical conductors so that when these insulation materials are assembled with the electrical conductors said pins not only hold the insulation members on the electrical conductors but also cooperate with said members to prevent the conductors from spreading apart.

3 Claims, 14 Drawing Figures

PATENTED MAY 28 1974 3,813,480

DEVICE OF INSULATING MATERIAL HOLDING ADJACENT LENGTHS OF SEMI-RIGID ELECTRICAL CONDUCTORS JOINED

DESCRIPTION OF THE INVENTION

This invention relates to insulation means for overlapping junctions of semi-rigid electrical conductors and preventing such junction from spreading.

An object of this invention is to provide an improved device for enclosing the junction of semi-rigid electrical conductors, said device having means preventing said junction from spreading.

Another object of this invention is to provide an improved retaining means for enclosing the junction of semi-rigid electrical conductors, said retaining means being constructed so that it may be efficiently and economically manufactured and installed.

Another object of this invention is to provide an insulation enclosure for the junction of semi-rigid electrical conductors, said insulation enclosure comprising two similar parts which are provided with pins that not only hold these parts assembled but also prevent the electrical conductor junction from spreading.

Other and further objects of this invention will be apparent to those skilled in the art to which it relates from the following specification, claims and drawing.

In accordance with this invention there is provided an improved device for enclosing the junction of lengths of semi-rigid electrical conductors which are partially surrounded by insulation casings that extend almost to the junction. These portions of the electrical conductors are covered by the enclosing means which is of insulation material made in two similar parts. These similar parts are provided with pins and holes which are aligned with holes provided in the web portions of the electrical conductors.

The electrical conductors which are of conventional construction comprise two parallel tubes that are made of a sheet of metal and formed so that the tubes are joined by a web of the metal therebetween. The conductors are covered by a casing that is open along the bottom thereof so that the lower surface of one of the tubular conductors is exposed and may be contacted by a sliding brush of graphite or similar conducting material whereby electric current from the conductor may be transmitted through said brush to the electrical apparatus utilizing the current.

The electrical conductors are supported in a conventional manner by gripping means which extends into recesses formed in external surfaces of the insulation casings. The tubular portions of the electrical conductors are aligned at the junctions thereof by means of short pins which are press fitted into the tubular conductors. Thus, when the conductors are joined the workman performing this operation employs a pair of conventional tongs which are provided with pins that are inserted into the holes in the conductors adjacent to the junction. The workman then operates the tongs and forces the conductors towards each other thereby pressing the pins into the tubular portions of the conductors.

Further features and details of this invention will be set forth in the following specification, claims and drawing in which, briefly:

Figure 1:
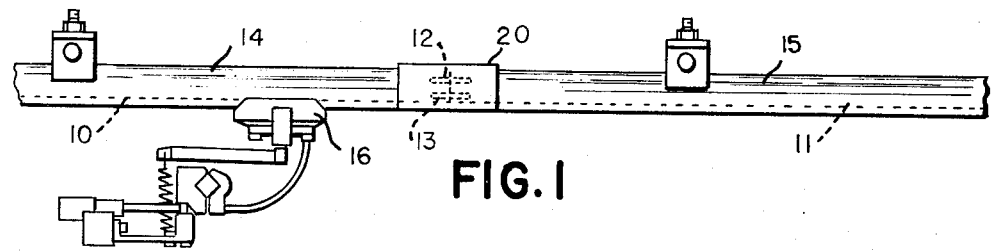
FIG. 1 is a view showing a pair of insulation encased electrical conductors supported in a conventional manner and provided with one of the devices of this invention enclosing a junction between the electrical conductors.

Referring to the drawing in detail, reference numerals 10 and 11 designate tubular electrical conductors which are joined by pins 12 and 13 that fit snugly into the end portions of the conductors 10 and 11. Pins 12 and 13 also carry electric current flowing through the conductors 10 and 11 particularly in cases where there may be slight spacing between these conductors at the junction. Each of the conductors 10 and 11 is formed of sheet metal such as aluminum, copper or the like shaped into parallel tubular portions joined by a web. The conductors 10 and 11 are positioned in the covers 14 and 15, respectively, of insulation material and the bottoms of these covers are open so as to provide access to the lower surface of the conductors 10 and 11 for the rubbing contact of a brush or shoe (not shown) that is supported in the insulation member 16. The lower portions of the covers 10 and 11 extend down well below the lower surface of the conductors 10 and 11 so that these conductors are protected from accidental contact.

Figure 4:
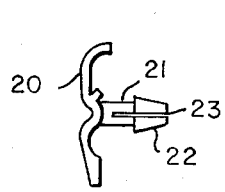
FIG. 4 is an end view of the member shown in FIG. 3.
Figure 3:
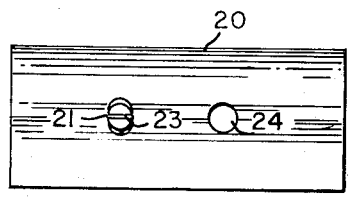
FIG. 3 is a plan view of one of the junction covering members such as shown in FIG. 2.
Figure 2:
FIG. 2 is an enlarged view of the junction between the electrical conductors shown in FIG. 1 and showing the junction exposed with one of the covering elements positioned on the back side thereof.

The conductors 10 and 11 are provided with holes 18 and 19, respectively, in adjacent end portions and these holes are positioned in the centrally disposed webs of these conductors. The portions of these conductors adjacent to the holes 18 and 19 are not covered by the insulation 14 and 15 so that the holes 18 and 19 are accessible to a suitable tong-like tool (not shown) which is used for drawing the conductors 10 and 11 together while the pins 12 and 13 are pressed into the tubular end portions of the conductors. For this purpose the tong-like tool is provided with suitable pins which are inserted into the holes 18 and 19 and when the tool is operated by gripping the handles thereof the conductors 10 and 11 are brought together forcing the pins 12 and 13 into the tubular ends thereof. After the conductors 10 and 11 are joined in this manner, the exposed portions thereof adjacent to the holes 18 and 19 are covered by a suitable insulation cover made of two similar pieces. One of these pieces 20 is shown in FIG. 2 and this piece is provided with a pin 21 integral therewith that is shown positioned in the hole 18. This piece has another hole which is aligned with the hole 19 of the conductor 11. Another piece such as piece 20 is provided with the pin 21 of this other piece is inserted into the hole 19 so that the pin 21 thereof enters hole 19 and hole 24 of the back piece shown in FIG. 2. Thus, when the front and back pieces 20 are assembled the pin 21 of one of these pieces is in the hole 18 as shown in FIG. 2 and the pin 21 of the other of these pieces is in the hole 19 and it extends through the hole 24 of the back piece. Pins 21 of these pieces are provided with locking elements 22 on the ends thereof as shown in FIGS. 3 and 4. These enlarged portions of the pins are slotted as indicated at 23 so that the pins are compressed when they are inserted into the holes and snap-locked in position after emerging from the holes to lock the pieces 20 together.

Figures 7, 8:
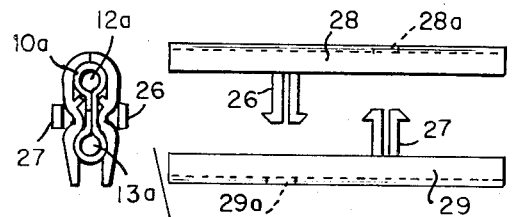
FIG. 7 is an exploded view showing the opposing cover members provided to a conductor junction such as shown in FIG. 5.
FIG. 8 is an end view of the junction covering members shown in FIG. 7 assembled with the electrical conductors.
Figures 5, 6:
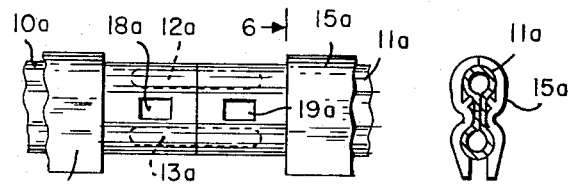
FIG. 5 is a view showing the junction between the semi-rigid electrical conductors, the portions adjacent to the junction being provided with rectangular holes.
FIG. 6 is a sectional view taken along the lines 6—6 of FIG. 5.

The holes 18 and 19 in the end portions of the conductors may be made substantially rectangular as shown at 18a and 19a in FIG. 5, and in that case the pins 26 and 27 of the junction covers 28 and 29 shown in FIG. 7 are of substantially rectangular shape to fit into these holes. Thus, when the junction covers 28 and 29 are assembled with the conductors 10a and 11a shown in FIG. 5 the pins 26 and 27 extend through holes 18a and 19a, respectively, of the conductors. Pin 26 extends through the hole 29a of cover 29 and pin 27 extends through hole 28a of cover 28, and the enlarged ends of these pins project out of the opposite sides of the cover members 28 and 29 as shown in FIG. 8.

Figures 9, 10:
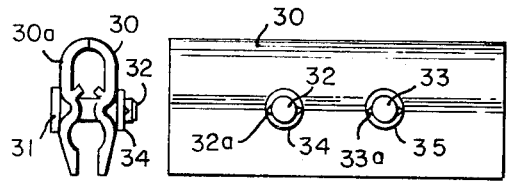
FIG. 9 is a side view of junction covering members of modified form which are held together by a separate pin unit.
FIG. 10 is an end view of the junction covering members shown in FIG. 9.
Figure 11:
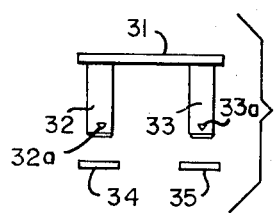
FIG. 11 is an exploded view of the pin arrangement used for holding the junction covering members shown in FIGS. 9 and 10 assembled.

The junction covers may be made simply plain without any retaining pins integral therewith and in such case covers are provided each with two holes for receiving the substantially U-shaped retaining and locking member such as illustrated in FIG. 11. The locking member 31 is provided with two pins 32 and 33 which are spaced apart the same distance as the holes provided in the cover elements 30 and 30a so that when these cover elements are assembled on the conductors the pins 32 and 33 extend through the cover elements as shown in FIG. 10 and the small projections 32a and 33a on the pins 32 and 33, respectively, are snapped into locking engagement on the washers 34 and 35, respectively, to hold the cover elements assembled.

Figure 13:
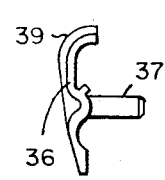
FIG. 13 is an end view of the junction covering member shown in FIG. 12.
Figure 12:
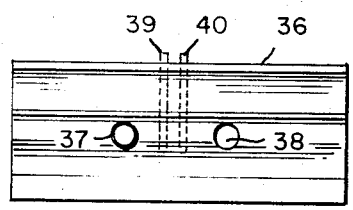
FIG. 12 is a side view of another modified form of junction covering members.
Figure 14:
FIG. 14 is a view of a U-shaped retaining member used for holding junction covering members such as shown in FIGS. 12 and 13 assembled on the junction between the semi-rigid electrical conductors.

The junction cover elements may also be provided with plain pins such as shown in FIGS. 12 and 13 in which case no locking means is provided to the pins. In this instance, both of the cover elements are made as indicated at 36 in FIG. 12. Each cover element is provided with a pin 37 and a hole 38 and spaced parallel projections 39 and 40. When two such cover elements are assembled the retaining spring member 41 is clipped across the assembled cover elements so that it is positioned between the projections 39 and 40 provided to the cover elements and holds the cover elements assembled.

While I have shown and described a preferred form of the invention, it will be apparent that the invention is capable of modification and variation from the form shown so that the scope thereof should be limited only by the scope of the claims appended hereto.

What I claim is:

1. In a junction between adjacent lengths of semi-rigid electrical conductors, the improvement comprising a pair of members of insulation material lapped over the junction of adjacent end portions of the electrical conductors, pin shaped means of insulation material integral with said members, said pin shaped means being inserted in holes in said members and holding said insulation members assembled with said adjacent end portions of said electrical conductors, said pin shaped means being positioned in holes formed through said adjacent end portions of said electrical conductors so that said members and said pin shaped means retain the adjacent ends of said electrical conductors substantially abutting each other.

2. In a junction of lengths between semi-rigid electrical conductors which are partially surrounded by insulation casings that extend almost to the junction, said conductors having means at said junction holding them in alignment, the improvement comprising opposing members of insulating material, means supporting said members on opposite sides of the junction of the electrical conductors comprising a pair of pins, one of said pins being integral with one of said members and inserted into a hole in the other of said members and the other of said pins being integral with the other of said members and inserted into a hole in said one of said members, the end portions of said members overlapping the end portions of said casings adjacent to said junction, said conductors each having a hole therethrough adjacent to said junction, said pins of said members being aligned with and extending through said holes in said conductors, said pins and said members holding said conductors together at said junction.

3. The structure as set forth in claim 2, further characterized in that said pins have the ends thereof bifurcated and enlarged to permit insertion and locking of said pins in the holes in said members.

* * * * *